(12) United States Patent
Claus et al.

(10) Patent No.: US 6,850,395 B2
(45) Date of Patent: Feb. 1, 2005

(54) SYSTEM AND METHOD FOR AUTOMATIC RE-CLOSURE AND RE-CLOSING DEVICE

(75) Inventors: Michael Claus, Langenzenn (DE); Volker Rissland, Marwitz (DE); Henry Zimmer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/239,082

(22) PCT Filed: Feb. 21, 2001

(86) PCT No.: PCT/DE01/00718

§ 371 (c)(1),
(2), (4) Date: Sep. 19, 2002

(87) PCT Pub. No.: WO01/71877

PCT Pub. Date: Sep. 27, 2001

(65) Prior Publication Data

US 2003/0030953 A1 Feb. 13, 2003

(30) Foreign Application Priority Data

Mar. 20, 2000 (DE) .......................................... 100 14 929

(51) Int. Cl.⁷ ................................................. H02H 3/00
(52) U.S. Cl. .......................................... 361/71; 361/72
(58) Field of Search ............................. 361/61, 62, 63, 361/64, 65, 66, 67, 68, 71, 72, 73, 74, 75, 59

(56) References Cited

U.S. PATENT DOCUMENTS

| 3,970,898 | A | * | 7/1976 | Baumann et al. ............. 361/68 |
| 4,484,246 | A |   | 11/1984 | Andow |
| 4,561,120 | A | * | 12/1985 | Andow et al. ............... 359/177 |
| 5,341,268 | A | * | 8/1994 | Ishiguro et al. ............... 361/62 |
| 5,543,995 | A | * | 8/1996 | Kumagai et al. ............. 361/65 |
| 5,579,195 | A | * | 11/1996 | Nishijima et al. ............ 361/62 |
| 5,805,400 | A | * | 9/1998 | Kim ............................. 361/71 |
| 5,825,602 | A | * | 10/1998 | Tosaka et al. ................ 361/94 |
| 5,973,899 | A | * | 10/1999 | Williams et al. .............. 361/72 |
| 6,434,715 | B1 | * | 8/2002 | Andersen ..................... 714/39 |

FOREIGN PATENT DOCUMENTS

AT      346 959      4/1978

OTHER PUBLICATIONS

English Translation for H. Titze: "Fehler und Fehlerschutz in elektrischen Drehstromanlagen", 2 Band, 1953, pp. 223–227.

* cited by examiner

Primary Examiner—Ronald Leja
Assistant Examiner—Danny Nguyen
(74) Attorney, Agent, or Firm—Morrison & Foerster LLP

(57) ABSTRACT

The invention relates to a method for automatically re-closing when there is a short-circuit in a line section of an electric energy supply line, whereby said section is defined by one switch respectively which comprises an allocated short-circuit detection device. According to the inventive method and after the switches have been released by a short-circuit, a re-closing instruction that is produced on the one end of the line section trips the switch on the other end. The aim of the invention is to carry out said method in such a way that the switch is treated with care as far as possible. The switch on the other end of the line section is tripped after a predetermined time delay provided that the short-circuit in the line section terminates during the time delay.

4 Claims, 1 Drawing Sheet

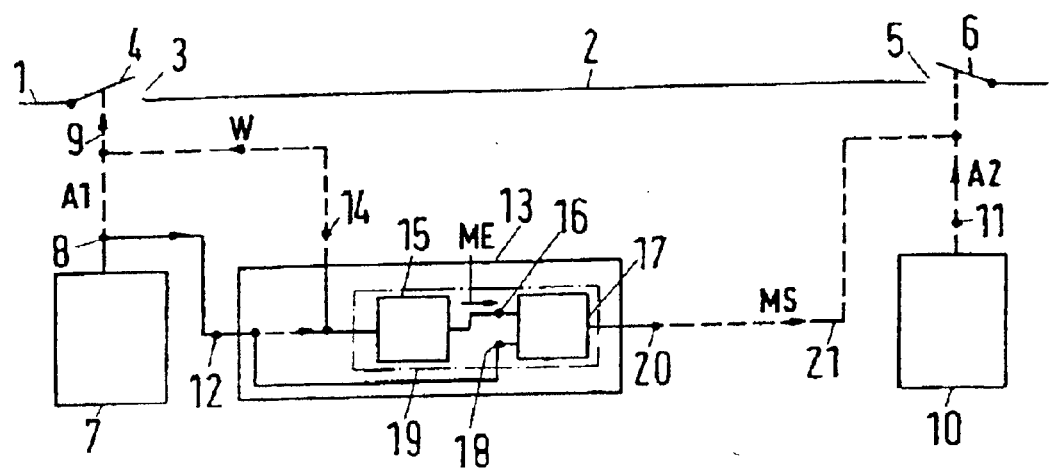

SYSTEM AND METHOD FOR AUTOMATIC RE-CLOSURE AND RE-CLOSING DEVICE

CLAIM FOR PRIORITY

This application claims priority to International Application No. PCT/DE01/00718 which was published in the German language on Sep. 27, 2001.

TECHNICAL FIELD OF THE INVENTION

The invention relates to a method for carrying out an automatic re-closure upon a short-circuit in a line section.

BACKGROUND OF THE INVENTION

A method of this type is known from the book by H. Titze "Fehler und Fehlerschutz in elektrischen Drehstromanlagen", [Faults and Fault Protection in Electrical Three-phase Systems], Volume 2, 1953, pages 223 to 227, particularly page 227. In this method, a breaker having one short-circuit detection device is provided at each end of a line section of an electrical energy supply line to be monitored. If the short-circuit detection devices detect a fault in the line section to be monitored, they actuate the associated circuit breakers by means of a tripping signal whereupon the breakers open by separating the line section from the energy supply line. A re-closing device, particularly a re-closing relay, ensures that the breaker at the one end of the line section is closed again after a short time by delivery of a re-closing command. During this process, actuation of the re-closing device also trips the breaker at the other end of the line section and thus also closes it. In the method, therefore, the two breakers at the ends of the line section to be monitored are re-closed quasi-synchronously.

SUMMARY OF THE INVENTION

The invention discloses a system and method for carrying out an automatic re-closure upon a short-circuit in a line section, limited by a breaker with associated short-circuit detection device, of an electric energy supply line, in which line section after the breakers have been tripped due to a short-circuit, the breaker at the other end has been inter-tripped by a re-closing command generated at one end of the line section.

One advantage of the invention is that the breakers are re-closed with the greatest possible care.

According to one embodiment of the invention, the breaker at one end is inter-tripped with a predetermined time delay if the short-circuit has already ended at the beginning of the time delay. The invention is not restricted to only one additional or other end being allocated to one end of the line section, but can also be applied in the case of those line sections from which branch lines diverge which are in each case limited with a breaker at their end facing away from the one end of the line section.

In another embodiment of the invention, the breakers of the line section to be monitored are operated with as much care as possible. This is attributable to the fact that in the method according to the invention, re-closing is initially only carried out with respect to the breaker at one end of the line section. If after this re-closure the associated short-circuit detection device still finds a short-circuit, the breaker is opened again by further tripping. During this time, the breaker at the other end of the line section remains unoperated. Therefore, is not switched to a short-circuit which is still in existence and it is thus protected. When a predetermined time delay has elapsed, and a short-circuit is not detected at the one end of the line after the re-closure, the breaker at the other end of the line section is switched on. In one aspect of the invention, a simultaneous connection at both ends to a short-circuit which may still exist is prevented, and the system stability is impaired to a lesser degree.

In another embodiment of the invention, the breaker at the other end is inter-tripped by having applied to it an inter-tripping signal which is delayed by the predetermined time delay with respect to the re-closing command and which is derived from the re-closing command.

It has also been found to be advantageous if the inter-tripping signal is generated if, after the occurrence of the re-closing command, the predetermined time delay has occurred without further tripping having been initiated at the one end of the line section by the short-circuit detection device.

In still another embodiment of the invention, there is a re-closing device at one end of a line section, limited by one breaker with associated short-circuit detection device, of an electrical energy supply line, with an output for delivering a re-closing command to the breaker at one end of the line section and with an output chip for outputting an inter-tripping signal to the breaker at the other end of the line section.

In one aspect of the invention, to achieve a breaker-protecting operating mode with such a re-closing device, the output chip is connected at its input to the output of the re-closing device, according to the invention, and exhibits a time delay element which delivers a status signal after a predetermined time delay has elapsed. The time delay element is connected to one input of a logic circuit which is connected with another input to an output of the short-circuit detection device of one end of the line section, and the output of the logic circuit is connected to the breaker at the other end of the line section via a communication channel.

According to one aspect of the invention, the re-closing device can be used for obtaining a time-delayed inter-tripping signal, which contributes to the breaker protection, in a comparatively simple manner, that is to say with little circuit expenditure.

BRIEF DESCRIPTION OF THE DRAWINGS

The invention is further detailed below with reference to the drawings, in which:

FIG. 1 shows the elements of an arrangement with a re-closing device according to the invention.

DETAILED DESCRIPTION OF THE PREFERRED EMBODIMENTS

FIG. 1 shows an electrical energy supply line 1 which includes a line section 2. This line section 2 is limited at one end 3 by a breaker 4 and at another other end 5 by a breaker 6.

The breaker 4 at the one end 3 is associated with a short-circuit detection device 7 which detects, in a manner not shown, current and voltage at the electrical energy supply line 1 or the line section 2, respectively, and in the case of a short-circuit, generates from these detected quantities at its output 8 a tripping signal A1 which brings the breaker 4 into an open position shown, via a connection 9 drawn diagrammatically. Accordingly, the breaker 6 is associated at its other end 5 with a further short-circuit detection device 10 which also generates a tripping signal A2 at its output 11 from the currents and voltages at the energy supply line if a short-circuit has occurred in the line section 2; following the tripping signal A2, the breaker 6 is brought into the open position shown.

Since a short-circuit on an energy supply line, particularly an open-wire line, is frequently formed by an arc, the so-called method of automatic re-closure has been carried out for a long time. In the arrangement for carrying out the method according to the invention, shown in the figure, this is done in the following way:

If a tripping signal A1 has been generated by the short-circuit detection device 7 at its output 8, this tripping signal is also supplied to an input 12 of a re-closing device 13. After a predetermined time, this re-closing device 13 generates at its output 14 a re-closing command W by means of which the breaker 4 is closed. With the generation of the switch-on command W a delay element 15 of the re-closing device 13 is started which supplies a status signal ME to a logic circuit 17 via an input 16 after a predetermined time delay. Another input 18 of the logic circuit 17 is directly connected to the input 12 of the re-closing device 13 and therefore has applied to it the tripping signal A1. The delay element 15 and the logic circuit 17 form one output chip 19.

The logic circuit 17 or, respectively, the entire output chip 19 are configured such that an inter-tripping signal MS occurs at an output 20 of the output chip 19 or of the re-closing device 13, respectively, if during the time determined by the delay element 15 in accordance with the predetermined time delay, the short-circuit detection device 7 has not delivered another tripping signal via its output 8. This is the case if a short-circuit is no longer found after the breaker 4 has been re-closed. There is then no longer a short-circuit on the line section 2, so that the breaker 6 at the other end 5 of the line section 2 is closed protectively—without switching to a short-circuit—by the inter-tripping signal MS.

If, in contrast, the short-circuit detection device 7, after having delivered the re-closing command W to the switch 4, and thus after this breaker has been closed, finds that the short-circuit still exists on the line section 2, a further tripping signal is formed at the output 8 by means of which not only is the breaker 4 opened again but the delay element 15 is also reset again so that the status signal ME is no longer produced at its output. As a consequence, the inter-tripping signal MS also does not occur at the output 20, and the breaker 6 remains open.

What is claimed is:

1. A method for automatic re-closure in the case of a short circuit on a line section of an electric energy supply line, each end of said line section is limited by a breaker associated with a short-circuit detection device, comprising:

re-closing the breaker at one end by a re-closing command generated at the one end of the line section, after the breaker has been tripped due to a short circuit; and remote closing the breaker at another end with a predetermined time delay if the short-circuit has ended at the beginning of the time delay.

2. The method as claimed in claim 1, wherein the breaker at the another end is remote closed by application of remote closing signal, said remote closing signal is delayed by the predetermined time delay with respect to the re-closing command and said remote-closing signal is derived from the re-closing command.

3. The method as claimed in claim 2, wherein the remote-closing signal is generated if the predetermined time delay has occurred after the re-closing command without any additional tripping having been initiated by the short-circuit detection device at the one end of the line section.

4. A re-closing device at one end of a line section of an electrical energy supply line each end of said line section being limited by a breaker with an associated short-circuit detection device, comprising:

an output to deliver a re-closing command to the breaker at the one end of the line section; and an output chip to deliver a remote-closing signal to the breaker at the another end of the line section; and an input of the output chip is connected to the output of the re-closing device and the output chip exhibiting a closing-time delay element which delivers a status signal for generating a remote-closing signal after a predetermined closing-time delay has elapsed, wherein the closing-time delay element is connected to an input of a logic circuit which is connected with another input to an output of the short-circuit detection device of the one end of the line section, and the output of the logic circuit is connected to the breaker at the other end of the line section via a communication terminal.

* * * * *